(12) United States Patent
Baker et al.

(10) Patent No.: US 8,174,448 B2
(45) Date of Patent: May 8, 2012

(54) MULTILATERATION APPARATUS

(75) Inventors: Adam Alexander Baker, Southampton (GB); Timothy John Quilter, Salisbury (GB)

(73) Assignee: Roke Manor Research Limited, Romsey, Hampshire (GB)

( * ) Notice: Subject to any disclaimer, the term of this patent is extended or adjusted under 35 U.S.C. 154(b) by 461 days.

(21) Appl. No.: 12/409,947

(22) Filed: Mar. 24, 2009

(65) Prior Publication Data

US 2009/0273519 A1    Nov. 5, 2009

(30) Foreign Application Priority Data

Mar. 31, 2008  (GB) .................................. 0805787.9
Jul. 4, 2008    (GB) .................................. 0812211.1

(51) Int. Cl.
*G01S 3/02* (2006.01)
(52) U.S. Cl. ...................................................... 342/465
(58) Field of Classification Search ................... 342/465
See application file for complete search history.

(56) References Cited

U.S. PATENT DOCUMENTS

| | | | |
|---|---|---|---|
| 4,040,054 A * | 8/1977 | Overman ........................ | 342/13 |
| 6,094,169 A | 7/2000 | Smith et al. | |
| 6,191,738 B1 * | 2/2001 | Pfeil et al. ...................... | 342/457 |
| 7,420,947 B2 | 9/2008 | Sendonaris et al. | |
| 2002/0105933 A1 * | 8/2002 | Higuchi ......................... | 370/338 |
| 2004/0131032 A1 | 7/2004 | Sendonaris et al. | |
| 2004/0189521 A1 * | 9/2004 | Smith et al. .................... | 342/387 |
| 2008/0062043 A1 | 3/2008 | Gezici et al. | |
| 2008/0129601 A1 * | 6/2008 | Thomas ......................... | 342/465 |

FOREIGN PATENT DOCUMENTS

| | | |
|---|---|---|
| EP | 1 881 339 A1 | 1/2008 |
| GB | 2 250 154 A | 5/1992 |
| WO | WO 2005004337 A2 * | 1/2005 |

OTHER PUBLICATIONS

Combined Search and Examination Report dated Oct. 17, 2008 (Five (5) pages).
European Search Report dated Apr. 15, 2010 (Eight (8) pages).

* cited by examiner

*Primary Examiner* — Thomas Tarcza
*Assistant Examiner* — Frank J McGue
(74) *Attorney, Agent, or Firm* — Banner & Witcoff, Ltd

(57) ABSTRACT

In a multilateration apparatus a correlator is provided with a time of arrival correlation window which is set to cater for the path lengths that may be experienced before a signal from an object to be located is received by receivers in the system. This may be on the basis of the largest possible path length in the system or on a receiver by receiver basis.

6 Claims, 2 Drawing Sheets

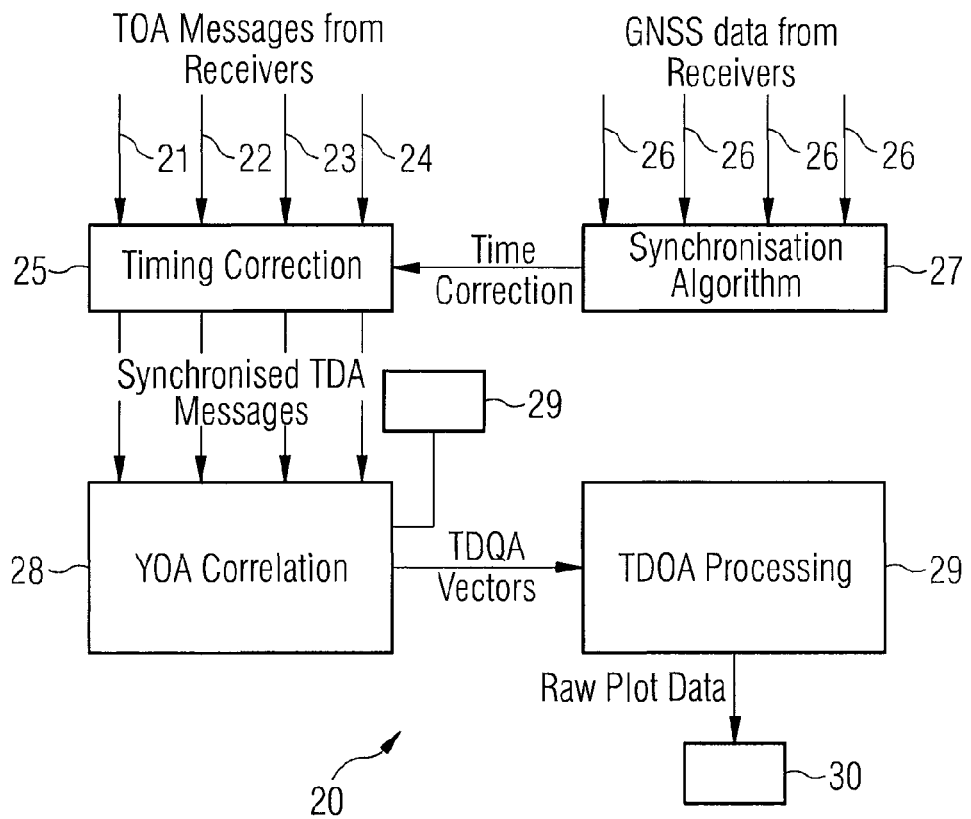
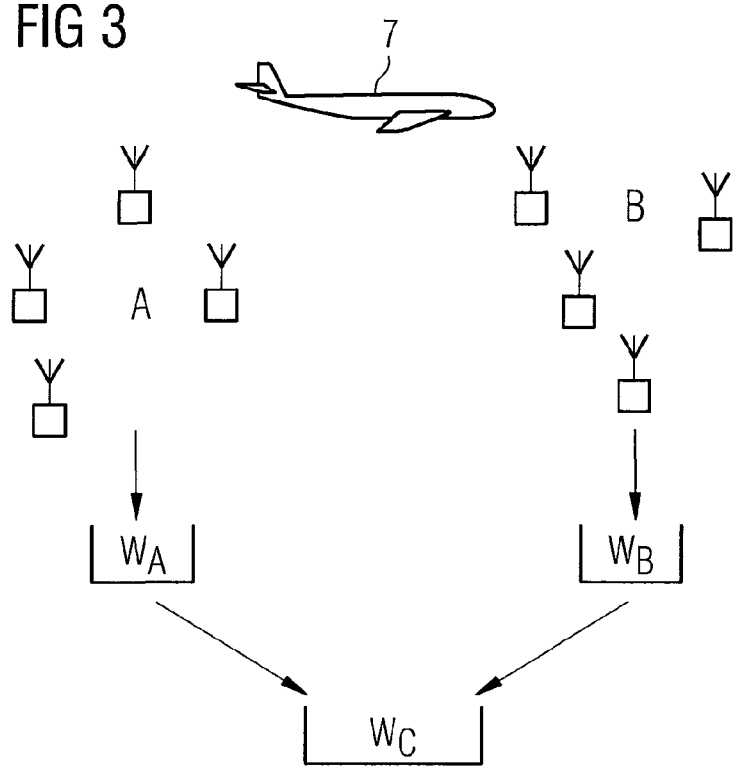

MULTILATERATION APPARATUS

This invention relates to a multilateration apparatus particularly but not exclusively for locating aircraft emitting a radio signal.

A multilateration system is an arrangement of receiver stations located at different geographical locations which receive a signal transmitted from an object the position of which is to be located. An aircraft positioning system is an example of a current application for multilateration. The aircraft transmits a signal which is received by ground based receivers. From the time of arrival of the signal at the receivers, and a knowledge of their positions, the position of the aircraft at the time of transmission may be determined. Such a system is described in GB2250154A the contents of which are incorporated herein by reference.

Each receiver station in the system needs an accurate frequency source for successful operation. As will be appreciated, for such safety critical applications involving often fast moving aircraft, accuracy and reliability is not a trivial matter. It is therefore not unusual to have expensive atomic clock based local frequency references such as a rubidium or caesium oscillator. However, even these suffer from performance drift particularly with environmental changes such as, in particular, temperature variations.

The time of arrival of the signal is usually measured against a time reference derived from the frequency source which is then correlated with a global time reference such as a Global Navigation Satellite System. In effect, the time of arrival of the signal (TOA) is measured at each receiver against a global clock using a time of arrival (TOA) correlator. The correlator monitors for the expected signal and ensures that the correct one is used to perform the multilateration calculation.

The correlated emissions from the aircraft are then used to provide TOA vectors which are then processed to derive the aircraft's position.

The present invention arose in an attempt to enhance the correlation of received signals in a multilateration system. In particular, to ensure speed and accuracy of correlation and to cater for performance changes and configuration changes.

According to the invention therefore there is provided a multilateration system controller comprising a time of arrival correlator for performing a time of arrival correlation using a time of arrival window based on receiver location which window comprising the time difference that may be experienced for receipt of a signal by receivers in the multilateration system, applying the window to received synchronised time of arrival data to determine which data has a low and which data has a high probability of originating from a single aircraft and passing at least the data with a high probability to a multilateration processor which performs a multilateration to determine the position of the aircraft.

By providing a time of arrival window which is based on the receiver locations, the window may be chosen to be the optimum for the configuration of receivers used. Advantageously, this will be done in a dynamic way based on the receiver combination used which allows for different time of arrival windows to be used for different receiver sets or subsets.

The invention is even more advantageous where receivers in different neighbouring multilateration systems are used. It has been proposed to use in boundary regions between systems the receivers from a first system in conjunction with receivers from a second system to provide a positioning capability covering the boundary area. A group of receivers may be formed from the two systems and their returns combined. GB2440572 describes such a system. The difficulty of using two systems is that they may work in accordance with different system clocks and other components which will be difficult to synchronise. Even when synchronised, as components age, synchronisation differences may arise. In a described embodiment of this invention this problem is alleviated by providing a correlation window which is at least in part based on a permissible synchronisation error which ensures correlation of received signals. The inventors have also appreciated that the systems may also experience differing environmental conditions due to weather which may also affect the system performance.

In the broadest aspect there is also provided a time of arrival correlation window applied to data from receivers in two or more different multilateration systems. Preferably, the time of arrival window is determined, at least in part, with reference to the receiver locations used. Again, preferably, the time of arrival window is determined, at least in part, from a determination of a potential system synchronisation mismatch.

The time of arrival window will be determined on considerations of the path lengths between the receivers used. The time of arrival window may therefore be changed as the combination of receivers used is varied. Whilst a worst possible case time of arrival window based on the maximum possible path length difference may be used, it is preferable for a number of windows to be used which are tailored to each receiver. This will maximise the number of correlated received signals.

The time of arrival window will be determined with reference to the speed of transmitted radio waves and the time thus taken for the signal to respective receivers depending upon the path length difference. This may be treated as the speed of light C in a vacuum but it may be a more accurate figure for the transmission of radio waves through the air. Means may be provided to adjust the figure used in accordance with the prevailing atmospheric conditions.

The time of arrival window may be defined and held in a memory table or it may be calculated prior to use.

A specific embodiment of the invention will now be described, by way of example only, with reference to the drawing in which:

FIG. 2 shows a correlator used in the system shown in FIG. 1; and

FIG. 3 shows the manner in which the invention may be used to correlate received signals from receivers in two distinct multilateration systems which are combined.

Figure 1:
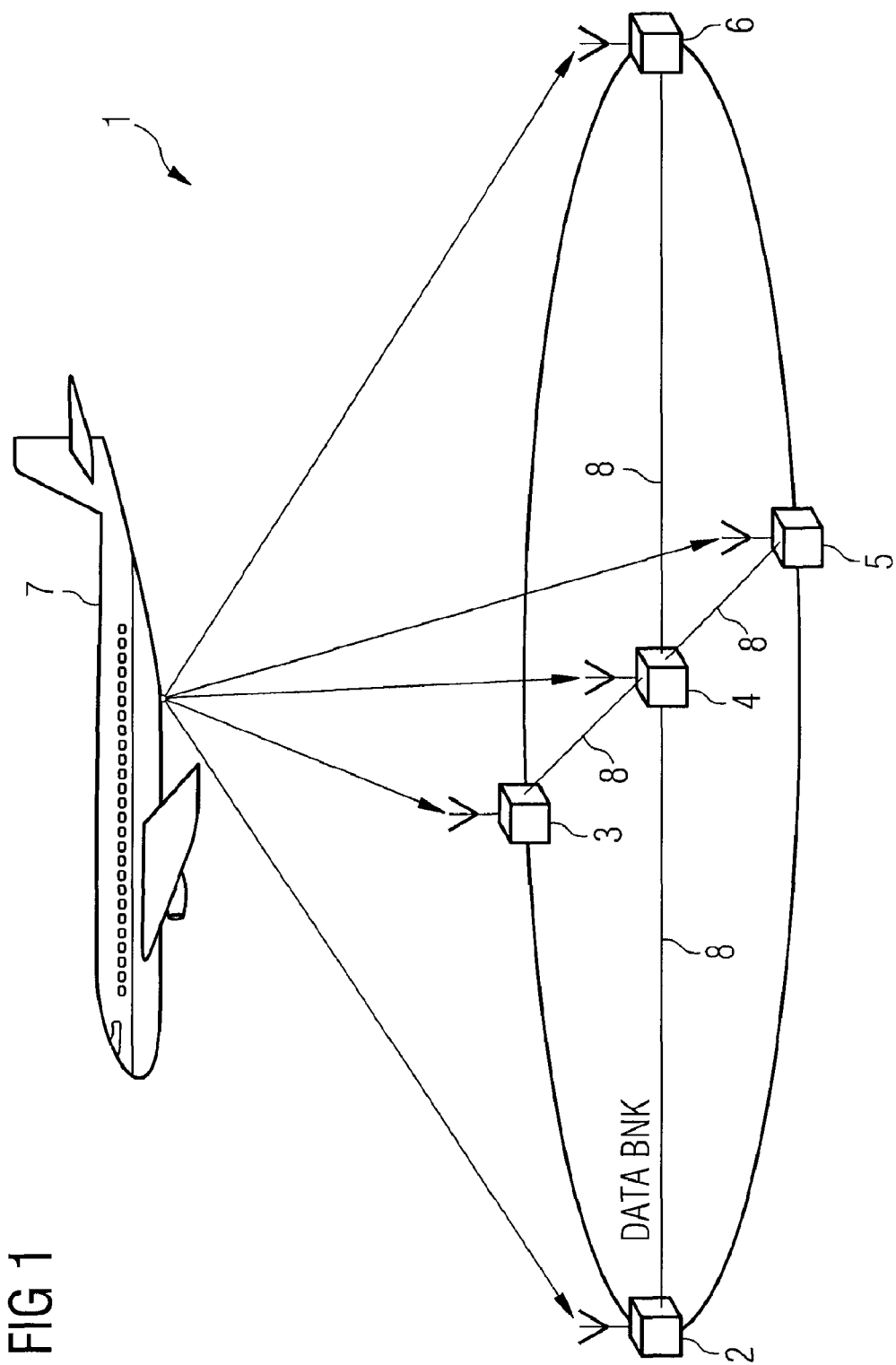
FIG. 1 shows an overview of a multilateration system in accordance with the invention.

As is shown in FIG. 1, a multilateration system 1 includes a plurality of receiver stations 2 to 6 positioned at a number of locations on the ground. These receive a transmitted signal including a code from a transponder mounted on an aircraft 7. The code is a Secondary Surveillance RADAR code which may be a mode A, mode S, mode C or may be an unknown mode of code.

Receiver station 4 is termed a master station because it includes a controller which uses the data from the receivers to perform the multilateration process. (In alternative embodiments it need not be co-located with the receiver.) The data from the receiver stations 2, 3, 5 and 6 is passed to the master station 4 over data links 8.

The controller 20 is microprocessor based and is shown in greater detail in FIG. 2. It includes a number of input ports 21 to 24 linked to the data links 8 and hence to the receiver stations. The input ports 21 to 24 are connected to a timing correction processor 25. This corrects for the variation in timing at each of the receiver stations using correction values derived in a known manner from Global Navigation Satellite System data provided by the receiver stations. This is received from the stations at ports 26 to a synchronisation processor 27. The synchronisation processor 27 applies a synchronisation algorithm to produce the required time correction. The time correction values are input to the timing correction processor 25. It will be appreciated that the timing correction may be a time difference that may be experienced for receipt of a signal by receivers in a multilateration system or in other ways.

The time corrected or synchronised time of arrival messages are coupled to a time of arrival correlator 28. The correlator 28 forms the data into sets which originate for particular transmissions of codes or events. The events are correlated by reference to time by application of a time of arrival window held in memory 29. Thus, if a mode A, mode C, mode S or an unknown mode code arrive within a certain time window or frame then they are considered to originate from the same aircraft as the same emission event. The correlator also ties up Time Of Arrival information from the same event for all the receivers as a so-called Time Of Arrival vector which may be of arbitrary length dependent upon the receivers that received a particular emission of a code. The vectors are then passed to a time difference of arrival processor 29 which applies a known multilateration process (for example, such as that disclosed in GB2349531) to produce track data which is passed to a track memory 30. The track memory 30 provides the tracks to a plotting system for the tracks of the aircraft and positions to be displayed.

The TOA correlator has the function of identifying and correlating the same signal received at the receivers. The signals are correlated according to their time of arrival using a time of arrival window held in the memory 29. There is a maximum difference in the time of arrivals that could arise from the same signal being received at different receivers. This is primarily due to the path differences between receiver sites and in this embodiment has a maximum value of 540 micro seconds. (This may vary according to the system so should be determined on a system to system basis.) If the signal arrives within the window it will have a high probability of arising from the same emission event.

In alternative embodiments, the time of arrival window may be determined when required. Also, more than one time window may be applied. For example, a system maximum path length case may be used to derive the window or it may be determined on a receiver to receiver basis. Thus a number of windows may be used in a dynamic manner to cater for the use of different combinations of receivers.

FIG. 3 shows a further embodiment. In this embodiment, a first multilateration system A provides time or arrival values which are correlated by using a window WA. Multilateration system B provides time of arrival values which are correlated by use of a window WB based on the path lengths involved in that system. The values are then provided to a combined system processor which correlates the time of arrival data using a correlation window WC. The window WC will be a window based on a consideration of the path lengths and the speed of propagation of radio waves to derive a time delay between the receivers in the effectively combined systems and also a time value which caters for the potential synchronisation differences or miss-match between system A and B. This is particularly advantageous since each system will have different system clocks and components which have parameters which may vary over time. Also environmental conditions over such geographically dispersed systems may vary considerably which again may cause system performance miss-matches. This may be taken into account when the window is established by the use of data provided by environmental sensors located with the receivers and systems.

Environmental sensor outputs may also be used to determine factors which will affect the propagation of the radio waves. This will have a bearing on the width of the time of arrival window used for correlation as the speed of propagation will determine the time delay due to path length differences.

The invention claimed is:

1. A multilateration system controller comprising:
a time of arrival correlator for performing a time of arrival correlation using a time of arrival window;
wherein the time of arrival window is based on the time difference that may be experienced for receipt of a signal by receivers in a multilateration system;
the correlator is arranged to apply the window to received time of arrival data to form the data into sets; and
the correlator is arranged to pass the data sets to a multilateration processor which is arranged to perform a multilateration process to determine the position of a source corresponding to each set.

2. A multilateration system controller as claimed in claim 1 in which the applied time of arrival window is determined with reference to a maximum time difference for the system for signals received by any receiver.

3. A multilateration system controller as claimed in claim 1 in which the applied time of arrival window is determined with reference to particular receivers.

4. A multilateration system controller as claimed in claim 1, in which the time of arrival correlator performs a correlation on data received from receivers in two or more multilateration systems using a time of arrival window based on a time difference that may be experienced for receipt of a signal by receivers in the multilateration systems.

5. A multilateration system controller as claimed in claim 4, wherein the time of arrival window is further determined in accordance with a predicted synchronized mismatch between the systems.

6. A method of correlating time of arrival data, comprising:
correlating the time of arrival data by applying a time of arrival window to received time of arrival data to form the data into sets; and
passing the data sets to a multilateration processor which is arranged to perform a multilateration process to determine a position of a source corresponding to each set,
wherein the time of arrival window is based on a time difference that may be experienced for receipt of a signal by receivers in a multilateration system.

\* \* \* \* \*